United States Patent
Turcinskas et al.

(10) Patent No.: US 12,049,426 B2
(45) Date of Patent: Jul. 30, 2024

(54) INORGANIC FOAM BASED ON GEOPOLYMERS

(71) Applicant: SIKA TECHNOLOGY AG, Baar (CH)

(72) Inventors: Sarunas Turcinskas, Trostberg (DE); Bernhard Feichtenschlager, Trostberg (DE); Gerhard Albrecht, Trostberg (DE); Pauline Petit, Trostberg (DE); Urs Gonzenbach, Buchs (CH); Philip Sturzenegger, Greifensee (CH)

(73) Assignee: SIKA TECHNOLOGY AG, Baar (CH)

( * ) Notice: Subject to any disclaimer, the term of this patent is extended or adjusted under 35 U.S.C. 154(b) by 1303 days.

(21) Appl. No.: 16/491,326

(22) PCT Filed: Mar. 5, 2018

(86) PCT No.: PCT/EP2018/055348
§ 371 (c)(1),
(2) Date: Sep. 5, 2019

(87) PCT Pub. No.: WO2018/162416
PCT Pub. Date: Sep. 13, 2018

(65) Prior Publication Data
US 2020/0017410 A1    Jan. 16, 2020

(30) Foreign Application Priority Data
Mar. 6, 2017    (EP) .................................. 17159448

(51) Int. Cl.
C04B 28/00    (2006.01)
C04B 14/28    (2006.01)
(Continued)

(52) U.S. Cl.
CPC ............ *C04B 28/008* (2013.01); *C04B 14/28* (2013.01); *C04B 16/0658* (2013.01);
(Continued)

(58) Field of Classification Search
CPC ... C04B 28/008; C04B 14/28; C04B 16/0658; C04B 24/10; C04B 38/02; C04B 2103/406; C04B 2111/40
(Continued)

(56) References Cited

U.S. PATENT DOCUMENTS

| 4,349,386 A | 9/1982 | Davidovits |
| 4,472,199 A | 9/1984 | Davidovits |

(Continued)

FOREIGN PATENT DOCUMENTS

| CN | 105 645 887 A | 6/2016 |
| DE | 0561978 A1 * | 9/1993 |

(Continued)

OTHER PUBLICATIONS

European Search Report for corresponding EP Patent Application No. 17159448.4, issued on Sep. 11, 2017.
(Continued)

*Primary Examiner* — James E McDonough
(74) *Attorney, Agent, or Firm* — Oliff PLC

(57) ABSTRACT

The present invention relates to a process for preparing a particle-stabilized inorganic foam based on geopolymers, to a particle-stabilized inorganic foam based on geopolymers, to a cellular material obtainable by hardening and optionally drying the particle-stabilized inorganic foam based on geopolymers, and to a composition for preparing an inorganic foam formulation for providing a particle-stabilized inorganic foam based on geopolymers.

14 Claims, 2 Drawing Sheets

Figure 1:
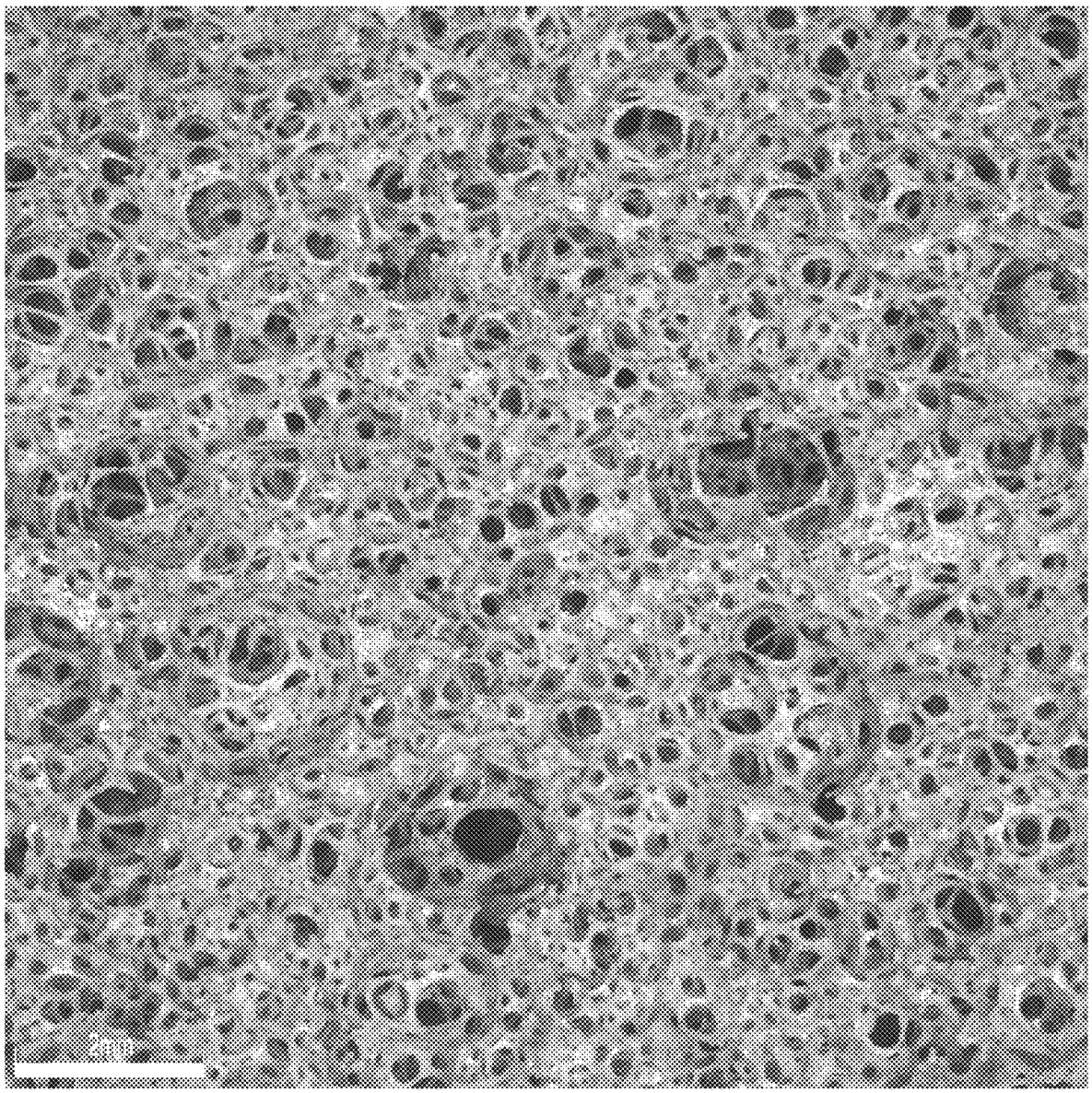

(51) Int. Cl.
*C04B 16/06* (2006.01)
*C04B 24/10* (2006.01)
*C04B 38/02* (2006.01)
*C04B 103/40* (2006.01)
*C04B 111/40* (2006.01)

(52) U.S. Cl.
CPC .............. *C04B 24/10* (2013.01); *C04B 38/02* (2013.01); *C04B 2103/406* (2013.01); *C04B 2111/40* (2013.01)

(58) Field of Classification Search
USPC .................................................. 106/638, 673
See application file for complete search history.

(56) References Cited

U.S. PATENT DOCUMENTS

| | | | |
|---|---|---|---|
| 9,540,287 | B2 | 1/2017 | Aldabaibeh et al. |
| 2009/0325780 | A1 | 12/2009 | Gauckler et al. |
| 2010/0010139 | A1 | 1/2010 | Davidovits et al. |
| 2014/0272376 | A1 | 9/2014 | Aldabaibeh et al. |

FOREIGN PATENT DOCUMENTS

| | | | |
|---|---|---|---|
| DE | 10 2014 103258 A1 | 9/2015 | |
| EP | 0 561 978 A1 | 9/1993 | |
| EP | 0561978 B1 * | 1/1997 | |
| JP | 2010001448 A * | 1/2010 | ............ C08F 120/44 |
| WO | WO 85/03699 A1 | 9/1985 | |
| WO | WO 92/10440 A1 | 6/1992 | |
| WO | WO 2007/068127 A1 | 6/2007 | |
| WO | WO 2008/012438 A2 | 1/2008 | |
| WO | WO 2011/064005 A1 | 6/2011 | |

OTHER PUBLICATIONS

International Search Report for corresponding PCT Patent Application No. PCT/EP2018/055348, mailed on May 11, 2018.
International Written Opinion for corresponding PCT Patent Application No. PCT/EP2018/055348, mailed on May 11, 2018.
International Preliminary Report on Patentability for corresponding PCT Patent Application No. PCT/EP2018/055348, mailed on Sep. 10, 2019.
Franziska Kraus Juillerat, et al., "Microstructural Control of Self-Setting Particle-Stabilized Ceramic Foams", Journal of the American Ceramic Society, vol. 94, Issue 1, Jan. 2011, pp. 77-83.
Strozi Cilla Marcelo, et al., "Geopolymer foams by gelcasting", Ceramics International, vol. 40, No. 4, Dec. 1, 2013, pp. 5723-5730. Elsevier, Amsterdam, NL.

* cited by examiner

INORGANIC FOAM BASED ON GEOPOLYMERS

CROSS REFERENCE TO RELATED APPLICATIONS

This application is a national stage application of International Application No. PCT/EP2018/055348, filed 5 Mar. 2018, which claims priority from European Patent Application No. 17159448.4, filed 6 Mar. 2017, which applications are incorporated herein by reference.

The present invention relates to a process for preparing a particle-stabilized inorganic foam based on geopolymers, to a particle-stabilized inorganic foam based on geopolymers, to a cellular material obtainable by hardening and optionally drying the particle-stabilized inorganic foam based on geopolymers, and to a composition for preparing an inorganic foam formulation for providing a particle-stabilized inorganic foam based on geopolymers.

Inorganic foams can be used as insulation material, e.g., as a thermal insulator, acoustic insulator or acoustic absorber as well as construction material with a low density. In contrast to foams based on organic polymers, this material is eco-friendly, robust, and non-flammable. The latter may also open up applications in the field of fire protection. Foams in general can be stabilized by use of surfactants or particles. Inorganic foams stabilized by surfactants typically have an open-cell foam structure. However, of particular interest are closed cell foams, as they have improved thermal insulation properties that go along with improved mechanical stability.

It has been found that stable inorganic foams with a closed-cell foam structure can be obtained by using inorganic particles as foam stabilizers. Typically, the presence of amphiphilic molecules is required to initiate surface activity of the used particles. WO 2007/068127 A1 discloses the stabilization of wet foams by colloidal particles, e.g., in combination with propyl gallate. Juillerat at al. (F. K. Juillerat, U. T. Gonzenbach, P. Elser, A. R. Studart, L. J. Gauckler, J. Am. Ceram. Soc. 2011, 94, 77-83) disclose the stabilization of ceramic foams by colloidal $A_2O_3$ particles that are partially hydrophobized by adsorption of propyl gallate molecules. U.S. Pat. No. 9,540,287 B2 discloses the use of propyl gallate molecules in combination with cementitious particles to stabilize foamed cementitious slurries. According to DE 102014103258 A1, a gypsum inorganic foam can be stabilized by inorganic particles in combination with amphiphilic molecules, such as heptyl amine.

Of particular interest are inorganic foams based on alkali activated aluminosilicates (geopolymers) as non-flammable insulation materials. However, surfactant-stabilized geopolymer foams have an open-cell foam structure, and therefore leave room for improvement in terms of the insulation properties and the mechanical stability. Furthermore, there is a need to improve the air flow resistance properties of surfactant-stabilized geopolymer foams, as their air flow resistance is typically below 200 kPa s/m² or even below 50 kPa s/m² or in certain cases even below 10 kPa s/m².

Accordingly, it was an object of the present invention to provide closed-cell inorganic foams based on geopolymers with improved properties in comparison to the geopolymer foams described in the prior art. In particular, it was an object to provide inorganic foams based on geopolymers, which exhibit a satisfying thermal conductivity combined with an improved compressive strength at a low dry density. Furthermore, it was an object to provide non-flammable inorganic foams based on geopolymers with improved air flow resistance properties.

It has surprisingly been found that the above objects can be achieved by the present invention, which is described hereinafter. In particular, it has been discovered that by combining (i) at least one group of inorganic particles, (ii) at least one amphiphilic compound, and (iii) at least one inorganic binder mixture comprising (iiia) at least one inorganic binder selected from the group consisting of blast furnace slag, microsilica, metakaolin, aluminosilicates, and mixtures thereof, and (iiib) at least one alkaline activator selected from the group consisting of alkali metal hydroxides, alkali metal carbonates, alkali metal aluminates, alkali metal silicates, and mixtures thereof; stable inorganic foams based on geopolymers can be obtained. The inorganic foams according to the invention have a closed-cell structure and advantageous properties in terms of the thermal conductivity as well as the compressive strength at a low dry density. Furthermore, it was a surprising finding of the invention that the air flow resistance of the inorganic foams of the present invention could be improved significantly in comparison to the air flow resistance of surfactant-stabilized inorganic foams.

In one embodiment, the present invention relates to a process for preparing an inorganic foam comprising the steps of (1) mixing
 (i) at least one group of inorganic particles;
 (ii) at least one amphiphilic compound;
 (iii) at least one inorganic binder mixture comprising
  (iiia) at least one inorganic binder selected from the group consisting of blast furnace slag, microsilica, metakaolin, aluminosilicates, and mixtures thereof,
  (iiib) at least one alkaline activator selected from the group consisting of alkali metal hydroxides, alkali metal carbonates, alkali metal aluminates, alkali metal silicates, and mixtures thereof;
 (iv) water; and optionally
 (v) at least one additive; and
(2) foaming the resulting foam formulation by chemical, physical or mechanical foaming,
 wherein the at least one amphiphilic compound comprises amphiphilic compounds with at least one polar head group and at least one apolar tail group, wherein the at least one head group is selected from the group consisting of phosphates, phosphonates, sulfates, sulfonates, alcohols, amines, amides, pyrrolidines, gallates, and carboxylic acids (i.e. —C(O)OH groups); and wherein the at least one tall group is selected from an aliphatic or an aromatic or a cyclic group with 2 to 8 carbon atoms, wherein the carbon atoms are optionally substituted with one or more, same or different substituents selected from $C_1$-$C_8$-alkyl, secondary —OH, and secondary —NH₂.

Throughout the present specification, "secondary —OH" and "secondary —NH₂" shall mean that the resulting substituted tall group forms a secondary alcohol or secondary amine.

In another embodiment, the present invention relates to an inorganic foam obtainable by the process of the present invention.

In yet another embodiment, the present invention relates to an inorganic foam comprising
(i) the at least one group of inorganic particles;
(ii) the at least one amphiphilic compound;
(iii) the at least one inorganic binder mixture comprising (iiia) at least one inorganic binder selected from the group consisting of blast furnace slag, microsilica, metakaolin, aluminosilicates, and mixtures thereof, and (iiib) at least one alkaline activator selected from the group consisting of alkali metal hydroxides, alkali metal carbonates, alkali metal aluminates, alkali metal silicates, and mixtures thereof, (iv) water; and optionally (v) the at least one additive.

In yet another embodiment, the present invention relates to a cellular material obtainable by hardening and optionally drying an inorganic foam as defined herein.

In yet another embodiment, the present invention relates to a composition for preparing an inorganic foam formulation comprising as components (i) the at least one group of inorganic particles;

(ii) the at least one amphiphilic compound;

(iii) the at least one inorganic binder mixture comprising (iiia) at least one inorganic binder selected from the group consisting of blast furnace slag, microsilica, metakaolin, aluminosilicates, and mixtures thereof, and (iiib) at least one alkaline activator selected from the group consisting of alkali metal hydroxides, alkali metal carbonates, alkali metal aluminates, alkali metal silicates, and mixtures thereof;

wherein the components (i), (ii), and (iii) are present separately; or the components (i) and (ii) are present as a mixture and component (iii) is present separately; or the components (i), (ii) and (iii) are present as a mixture.

Figure 2:
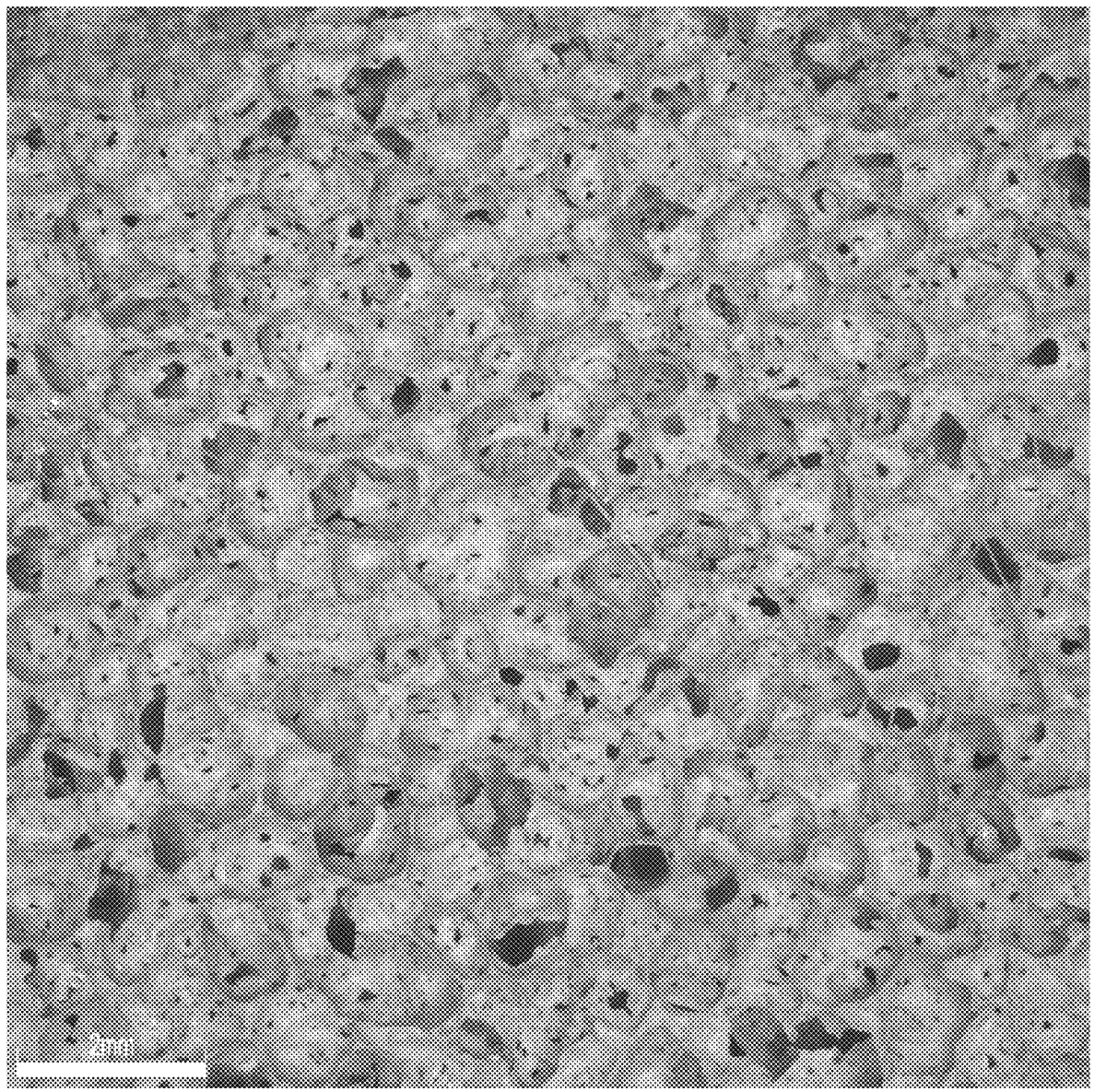

The present invention is further illustrated by FIGS. 1 and 2. FIG. 1 is provided for comparative purposes and shows a picture of a surfactant-stabilized geopolymer foam with an open-cell structure (Comparative Example 1). FIG. 2 shows a picture of an inorganic foam according to the present invention with a mainly closed-cell structure (Working Example 1). In both Figures the scale bar on the lower left side is 2 mm.

The following definitions are relevant in connection with the embodiments of the present invention.

The term "about" in respect to a measurable unit refers to normal deviations of said measurable unit. Such deviations depend on the precision of the measuring apparatus or they depend on statistical deviations that are expected by the skilled person. It is to be understood that the term "about" means a deviation of ±15%, preferably ±10%, more preferably ±5%.

The term "wt.-%" refers to the ratio of the mass of the respective component in relation to the sum of the mass of all components except water in percent, if not stated otherwise. Thus, the at least one alkaline activator is calculated in terms of the solid contents thereof. All water is calculated as component (iv). The term vol.-% refers to the ratio of the volume of the respective component in relation to the sum of the volume of all components in percent.

The meaning of the term "comprising" is to be interpreted as encompassing all the specifically mentioned features as well optional, additional, unspecified ones, whereas the term "consisting of" only includes those features as specified. It is moreover intended that in each actual case the sum of all of the percentages of the specified and unspecified constituents of the formulation of the invention is always 100%.

In the context of the process for preparing an inorganic foam, the inorganic foam, the cellular material obtainable by hardening and optionally drying the inorganic foam, and the composition for preparing an inorganic foam formulation according to the present invention, the following definitions are relevant.

In general, it is distinguished between the terms "Inorganic foam formulation" and "inorganic foam". The inorganic foam formulation may be obtained from a suitable composition for preparing an inorganic foam formulation as defined herein by adding water and optionally at least one additive. The inorganic foam formulation may then be used to prepare an inorganic foam by mechanical, physical or chemical foaming. The freshly prepared (i.e. non-hardened) inorganic foam is to be distinguished from the hardened inorganic foam, i.e. the cellular material, which is obtainable from the freshly prepared inorganic foam by hardening and optionally drying. Unless otherwise indicated, the term "inorganic foam" as used herein refers to the freshly prepared inorganic foam, and the term "cellular material" refers to the hardened and optionally dried inorganic foam.

Inorganic foams are three-phase systems, wherein one phase is gaseous, one phase is liquid, and one phase is solid. Thus, it is to be understood that the inorganic foam comprises a gas. The gaseous phase is present as fine gas bubbles separated by cell walls obtained from the liquid and solid phases. The cell walls meet each other at edges which meet each other at nodes, thereby forming a framework. The content of the gaseous phase in the inorganic foam may vary in a range of from 20 to 99%, preferably from 50 to 98% by volume. The liquid phase is preferably an aqueous phase, so that the inorganic foam typically also comprises water. However, the water may be partly removed upon drying. The solid phase of an inorganic foam comprises an inorganic binder. Inorganic foams can be open-cell foams or closed-cell foams. In closed-cell foams, the gas is completely surrounded by the cell wall. Typically, at the same density, closed-cell foams are more robust than open-cell foams. Accordingly, closed cell foams are preferred due to their improved mechanical stability.

Cellular materials can be obtained from inorganic foams by hardening and optionally drying an inorganic foam.

Water as denoted herein, can refer to pure, deionized $H_2O$, or water containing up to 0.1 wt.-% impurities and/or salts, such as normal tap water.

The gas phase present in the foam can be introduced by mechanical, physical or chemical foaming. Non-limiting examples of gases comprise air, nitrogen, noble gas, carbon dioxide, hydrocarbons, hydrogen, oxygen, and mixtures thereof.

The gas phase present in the foam can be introduced by mechanical foaming in the presence of the respective gas. Mechanical foaming may be performed by using a mixer, or by an oscillating process, or by a stator-rotor process.

The gas phase can also be introduced into the foam by physical or chemical foaming, wherein the physical or chemical foaming process is suitable to liberate a gas. Preferably, blowing agents are used, which evaporate, decompose or react with water and/or an acid, so as to liberate the gas. Non-limiting examples of blowing agents are peroxides, such as hydrogen peroxide, dibenzylperoxide, peroxobenzoic acid, peroxoacetic acid, alkali metal peroxides, perchloric acid, peroxomonosulfuric acid, dicumyl peroxide or cumyl hydroperoxide; isocyanates, carbonates and bicarbonates, such as $CaCO_3$, $Na_2CO_3$, and $NaHCO_3$, which are preferably used in combination with an acid, e.g., a mineral acid; metal powders, such as aluminum powder; azides, such as methyl azide; hydrazides, such as p-toluene-sufonylhydrazide; hydrazine.

Chemical foaming can be facilitated by the use of a catalyst. Suitable catalysts preferably comprise $Mn^{2+}$, $Mn^{4+}$, $Mn^{7+}$ or $Fe^{3+}$ cations. Alternatively, the enzyme catalase may be used as catalyst. Non-limiting examples of suitable catalysts are $MnO_2$ and $KMnO_4$. Such catalysts are preferably used in combination with peroxide blowing agents.

Further details regarding the components as used in the process for preparing an inorganic foam, the inorganic foam, the cellular material obtainable by hardening and optionally drying the inorganic foam, and the composition for preparing an inorganic foam formulation according to the present invention, are provided hereinafter.

The term "inorganic particles" as used herein preferably refers to inorganic particles selected from the group consisting of:
- Oxides, including pure and mixed metal oxides (particularly aluminum oxide, silicon dioxide, spinels, cerium-gadoliniumoxide, zirconium oxide, magnesium oxide, tin oxide, titanium oxide and cerium oxide);
- Hydroxides (particularly aluminum hydroxide, calcium hydroxide, magnesium hydroxide, very particularly aluminum hydroxide);
- Carbides (particularly silicon carbide, boron carbide);
- Nitrides (particularly silicon nitride, boron nitride);
- Phosphates (particularly calcium phosphates, such as tricalciumphosphate, hydroxyapatite);
- Carbonates (particularly nickel carbonate, calcium carbonate (ground limestone or precipitated calcium carbonate), magnesium carbonate);
- Silicates (particularly silicon dioxide, silica fume, fly ash, quartz, ground glasses, slag, calcium silicates, mullite, cordierite, clay minerals like kaolin or bentonite, zirconium silicate, zeolites, diatomaceous earth, very particularly silica fume, clay minerals, zirconium silicate; specifically day minerals);
- Sulfates (particularly calcium sulfate).

It has to be understood that the inorganic particles (i) as exemplified hereinabove are neither identical to the inorganic binders (iiia), nor to the alkaline activators (iiib), nor to the additional inorganic binders (iiic). Moreover, the inorganic particles (i) preferably do not take part in the geopolymer formation reaction between the inorganic binders (iiia) and the alkaline activators (iiib).

Preferably, the inorganic particles are obtained from carbonates and/or oxides. Preferred oxides include pure and mixed metal oxides, selected from the group consisting of aluminum oxides (including Al—Mg spinels), silicon dioxides, zirconium dioxides, and zinc oxides, particularly aluminum oxide, silicon dioxide, and zirconium dioxide. A preferred carbonate is calcium carbonate.

The term "group of inorganic particles" as used herein is to be understood as a plurality if inorganic particles of one kind. It is also to be understood that at least one, i.e. one or more groups of inorganic particles may be used according to the invention, which means that also various mixtures of the above defined inorganic particles are possible.

Thus, in a preferred embodiment of the invention, the at least one group of inorganic particles is selected from the group consisting of oxides, hydroxides, carbides, nitrides, phosphates, carbonates, silicates, sulfates, and mixtures thereof.

In a more preferred embodiment, the at least one group of inorganic particles is selected from the group consisting of silica particles, alumina particles, zirconia particles, and $CaCO_3$ particles and mixtures thereof.

The particle size of the at least one group of inorganic particles may vary within a broad range. For powders (primary particles), suitable median particle sizes $D_{50}$ range from 30 nm to 300 μm, preferably from 100 nm to 250 μm, more preferably from 100 nm to 150 μm, even more preferably from 100 nm to 100 μm. In a further embodiment, suitable particle sizes range from 100 nm to 10 μm, preferably 100 nm to 2 μm. It was found that the particle size distribution is of less importance. Good foams can be obtained with narrow as well as with broad particle size distributions.

In a preferred embodiment of the invention, the at least one group of inorganic particles has a median particle size $D_{50}$ measured by dynamic light scattering in the range of from 30 nm to 300 μm.

The term "particle size ($D_x$)" refers to the diameter of a particle distribution, wherein x % of the particles have a smaller diameter. The $D_{50}$ particle size is thus the median particle size. The $D_x$ particle size can e.g. be measured by laser diffraction or dynamic light scattering (DLS) methods. According to the present invention dynamic light scattering (DLS) according to ISO 22412:2008 is preferably used. Dynamic light scattering (DLS), sometimes referred to as Quasi-Elastic Light Scattering (QELS), is a non-invasive, well-established technique for measuring the size and size distribution of molecules and particles typically in the submicron region. In the present invention the particles were characterized, which have been dispersed in a liquid, preferably water or ethanol. The Brownian motion of particles or molecules in suspension causes laser light to be scattered at different intensities. Analysis of these intensity fluctuations yields the velocity of the Brownian motion and hence the particle size using the Stokes-Einstein relationship. The distribution can be a volume distribution ($D_v$), a surface distribution ($D_s$), or a number distribution ($D_n$). In context of this application, the $D_x$ value refers to a number distribution, wherein x(number) % of the particles have a smaller diameter.

The term "amphiphilic compound" is known in the art and relates to organic compounds having an apolar part (also identified as tall or group R) and a polar part (also identified as head group). Accordingly, suitable amphiphilic molecules contain a tail coupled to a head group, typically by covalent bonds. Such amphiphilic molecules typically contain one tail and one head group, but may also contain more than one head group.

The tail can be aliphatic (linear or branched) or cyclic (alicylic or aromatic) and can carry substituents. Such substituents are e.g. —$C_nH_{2n+1}$ with n≤8, secondary —OH, secondary —$NH_2$, etc. Preferred tails are optionally substituted linear carbon chains of 2 to 8 carbon atoms, more preferably linear carbon chains of 3 to 8, 4 to 8 or 5 to 8 carbon atoms. (As to the definition of "secondary", see above.)

The head groups that are coupled to the tail preferably are ionic groups, ionizable groups and/or polar groups. Examples of possible head groups and corresponding salts are specified in Table 1 below (wherein the tail is designated as R).

TABLE 1

| | |
|---|---|
| phosphates<br>X: H, $C_nH_{2n+1}$ (n < 7),<br>alkali metals | HO—P(=O)(OR)—OX |
| phosphonates<br>X: H, $C_nH_{2n+1}$ (n < 7),<br>alkali metals | HO—P(=O)(R)—OX |
| sulfates | HO—S(=O)(=O)—OR |
| sulfonates | HO—S(=O)(=O)—R |
| alcohols | R—OH |
| amines X: H,<br>$C_nH_{2n+1}$ (n < 7) | X—N(X)—R |
| amides | R—C(=O)—NH$_2$ |
| pyrrolidines | (pyrrolidine ring with R on N, NH) |
| gallates | 3,4,5-trihydroxybenzoate ester: (HO)$_3$C$_6$H$_2$—C(=O)—O—R |
| carboxylic acids | R—C(=O)—OH |

Preferred head groups are selected from carboxylic acids, gallates, amines and sulfonates. Particularly preferred head groups are selected from carboxylic acids (i.e. the —C(O)OH group) and gallates. Gallates are most preferred. A preferred carboxylic acid is enanthic acid (heptanoic acid). A preferred gallate is butyl gallate. A preferred amine is heptylamine.

Preferably, the amphiphilic molecules reduce the surface tension of an air-water interface to values lower than or equal to 65 mN/m for concentrations lower than or equal to 0.5 mol/l.

Preferably, amphiphilic molecules have a critical micelle concentration (CMC) higher than 10 µmol/l and/or they have a solubility higher than 1 µmol/l.

It is to be understood that at least one, i.e. one or more members of amphiphilic compounds may be used according to the invention, which means that also various mixtures of the above defined amphiphilic compounds are possible.

Thus, in a preferred embodiment of the invention, the at least one amphiphilic compound comprises amphiphilic compounds with at least one polar head group and at least one apolar tail group,
wherein the at least one head group is selected from the group consisting of phosphates, phosphonates, sulfates, sulfonates, alcohols, amines, amides, pyrrolidines, gallates, and carboxylic acids;
and wherein the at least one tail group is selected from an aliphatic or an aromatic or a cyclic group with 2 to 8 carbon atoms, wherein the carbon atoms are optionally substituted with one or more, same or different substituents selected from $C_1$-$C_8$-alkyl, secondary —OH, and secondary —NH$_2$.

In a more preferred embodiment of the invention, the at least one amphiphilic compound comprises amphiphilic compounds with at least one head group selected from the group consisting of carboxylic acids, gallates and amines, and at least one tail group selected from aliphatic groups with 2 to 8 carbon atoms.

It is to be understood that upon combining the inorganic particles as defined herein with the amphiphilic compound as defined herein hydrophobized inorganic particles are formed. The term "hydrophobized inorganic particles" relates to inorganic particles, wherein the particle's surface is modified with amphiphilic molecules, so as to reduce the hydrophilic properties of the inorganic particle. Surface modification in this context means that the amphiphilic compounds are adsorbed on the particle's surface.

In a preferred embodiment, the amount of amphiphilic compound to inorganic particle surface is from 0.5 to 160 µmol/m$^2$, preferably from 1 to 100 µmol/m$^2$, more preferably from 2 to 70 µmol/m$^2$ and in particular from 5 to 60 µmol/m$^2$. In another preferred embodiment, the inorganic particles are provided in an amount of from 0.1 to 25 wt.-% with regard to the amount of the at least one inorganic binder mixture, preferably 0.25 to 15 wt.-%, more preferably 0.5 to 10 wt.-% and in particular 1 to 5 wt.-%.

The hydrophobized inorganic particles are suitable for stabilizing inorganic foams based on the inorganic binder mixture as defined herein. In a preferred embodiment, the weight ratio of water to inorganic binder mixture in the foam formulation is from 0.1 to 2.0, preferably from 0.2 to 1.5, more preferably from 0.3 to 1.2, and in particular from 0.3 to 0.9.

Inorganic binders are inorganic compounds that harden in an aqueous environment (hydraulic) or in the presence of air (non-hydraulic). For example, Portland cement is a hydraulic inorganic binder, whereas gypsum is a non-hydraulic binder. A latent hydraulic binder refers to a binder that only becomes hydraulic when exposed to an alkaline activator.

In the context of the present invention an inorganic binder mixture (iii) is used, which comprises
(iiia) at least one inorganic binder selected from the group consisting of blast furnace slag, microsilica, metakaolin, aluminosilicates, and mixtures thereof, and
(iiib) at least one alkaline activator selected from the group consisting of alkali metal hydroxides, alkali metal carbonates, alkali metal aluminates, alkali metal silicates, and mixtures thereof.

The inorganic binders blast furnace slag, microsilica, metakaolin, aluminosilicates and fly ash belong to the group of geopolymer binders. Geopolymers are described by way of example in U.S. Pat. No. 4,349,386, WO 85/03699 and U.S. Pat. No. 4,472,199.

Geopolymers are binders that are primarily based on $SiO_2$ and/or $Al_2O_3$, such as poly(sialate), poly(siloxo), poly (sialate-siloxo), or poly(sialate-disiloxo), which harden in alkaline aqueous environment. Sialate is an abbreviation for silicon-oxo-aluminum. Geopolymers material is similar to zeolite, however, the microstructure is amorphous and not crystalline. These binders may also contain compounds based on $Fe_2O_3$, $TiO_2$, CaO, MgO, NaO, or $K_2O$. Pure geopolymers generally have a low calcium content. WO 2011/064005 A1 describes an inorganic binder system which comprises from 12 to 25% by weight of CaO, and which permits production of construction chemical products that are resistant to chemical attack. Further non-limiting examples of geopolymers comprise microsilica, metakaolin, aluminosilicates, fly ash, activated clay, pozzolans, or mixtures thereof. Pozzolans are siliceous or siliceous and alumous containing compounds.

For the purposes of the present invention, a "latent hydraulic binder" is preferably a binder in which the molar ratio (CaO+MgO):$SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

As used herein, the term "slag" refers to the by-product of a smelting process, or synthetic slag. The main use of a smelting process is to convert an ore, scrap or a material mixture containing different metals into a form from which the desired metals can be skimmed as a metal layer and the undesired metal oxides, e.g. silicates, alumina, etc., remain as the slag.

Blast furnace slag (BFS) is formed as a by-product during the smelting of iron ore in the blast-furnace. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity. For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Amorphous silica is preferably an X-ray-amorphous silica, i.e. a silica for which the powder diffraction method reveals no crystallinity. The content of $SiO_2$ in the amorphous silica of the invention is advantageously at least 80% by weight preferably at least 90% by weight. Precipitated silica is obtained on an industrial scale by way of precipitating processes starting from water glass. Precipitated silica from some production processes is also called silica gel.

Microsilica is a fine powder, mainly comprising amorphous $SiO_2$, powder and is a by-product of silicon or ferrosilicon production. The particles have a diameter of about 100 nm and a specific surface area of from about 15 to about 30 $m^2$ $g^{-1}$.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly, pure metakaolin comprises about 54% by weight of $SiO_2$ and about 46% by weight of $Al_2O_3$.

Aluminosilicates are minerals comprising aluminum, silicon, and oxygen, which may be expressed by referring to the $SiO_2$ and $Al_2O_3$ content. They are a major component of kaolin and other clay minerals. Andalusite, kyanite, and sillimanite are naturally occurring aluminosilicate minerals that have the composition $Al_2SiO_5$.

Burnt shale, especially burnt oil shale is obtained at temperatures of about 800° C. by burning of natural shale and subsequent milling.

An overview of suitable raw materials for geopolymers is found by way of example in Caijun Shi, Pavel V. Krivenko, Della Roy, Alkali Activated Cements and Concretes, Taylor & Francis, London & New York, 2006, pp. 6-63.

In a preferred embodiment, the at least one inorganic binder is selected from the group consisting of blast furnace slag, microsilica, metakaolin, aluminosilicates, and mixtures thereof. In a particularly preferred embodiment, the at least one inorganic binder is metakaolin.

The alkaline activator mentioned above is required to establish an alkaline environment for activating the inorganic binder, i.e. the geopolymer binder, so that the latent hydraulic binder will become hydraulic.

It is preferable to select an alkaline activator from alkali metal hydroxides of the formula MOH and alkali metal silicates of the formula m $SiO_2 \times nM_2O$, where M is the alkali metal, preferably Li, Na or K or a mixture thereof, and the molar ratio m:n is $\leq 4.0$, preferably $\leq 3.0$, with further preference $\leq 2.0$, in particular $\leq 1.70$.

The alkali metal silicate is preferably water glass, particularly preferably an aqueous water glass and in particular a sodium water glass or potassium water glass. However, it is also possible to use lithium water glass or ammonium water glass or a mixture of the water glasses mentioned. The m:n ratio stated above (also termed "modulus") should preferably not be exceeded, since otherwise reaction of the components is likely to be incomplete. It is also possible to use very much smaller moduli, for example about 0.2. Water glasses with higher moduli should be adjusted before use to moduli in the range of the invention by using a suitable aqueous alkali metal hydroxide.

In a preferred embodiment, the at least one alkaline activator is water glass.

The term "water glass" refers to alkali metal silicates, which are water soluble. Water glass can be obtained by the reaction of alkali metal carbonates with quartz sand (silicon dioxide). However, they can also be produced from mixtures of reactive silicas with the appropriate aqueous alkali metal hydroxides. Non-limiting examples of water glass comprise $Na_2SiO_3$, $K_2SiO_3$, and $Li_2SiO_3$. In addition to the anhydrous form, various hydrates of water glass exist as well. Typical trace impurities are based on the elements Al, Ca, Cr, Cu, Fe, Mg, and Ti. The ratio of alkali metal to silicate can vary. This ratio is defined in terms of the molar ratio of m $SiO_2$ to n $M_2O$ as mentioned above. Typical values for the ratio m:n are values smaller than 4, smaller than 3, smaller than 2, or in the vicinity of 1.7.

Potassium water glasses in the advantageous modulus range are mainly marketed as aqueous solutions because they are very hygroscopic, sodium water glasses in the advantageous modulus range are also obtainable commercially as solids. The solids contents of the aqueous water glass solutions are generally from 20% by weight to 60% by weight, preferably from 40 to 60% by weight.

The preferred quantity of the alkaline activator is from 1 to 55 wt.-% and in particular from 10 to 50 wt.-%.

In a preferred embodiment, the at least one inorganic binder mixture (iii) further comprises at least one additional inorganic binder (iiic), preferably cement, calcium sulfate and/or fly ash. In a particularly preferred embodiment, the at least one inorganic binder mixture comprises at least one additional inorganic binder selected from portland cement, calcium aluminate cement, calciumsulfoaluminate cement, calciumsulfate, fly ash, and mixtures thereof. The amount of the additional inorganic binder (iiic), if present, has to be less than 30 wt.-%, preferably less than 25 wt.-%, more preferably less than 20 wt.-%, based on the total inorganic foam formulation.

Cement is an inorganic, finely milled hydraulic binder. The different types of cement are classified according to DIN EN 197-1 (11/2011) into the categories CEM I-V. These different cements vary from each other in their stability towards various corrosives and these cements therefore have different applications.

CEM I cement, also called Portland cement, contains about 70 wt.-% CaO and MgO, about 20 wt.-% $SiO_2$, about 10 wt.-% $Al_2O_3$ and $Fe_2O_3$. This cement is obtained by milling and baking limestone, chalk and clay. CEM II cement is Portland cement with a low (about 6 to about 20 wt.-%) or moderate (about 20 to about 35 wt-%) amount of additional components. This cement may further contain blast-furnace slag, fumed silica (10 wt.-% at most), natural pozzolans, natural calcined pozzolans, fly ash, burnt shale, or mixtures thereof. CEM III cement, also called blast-furnace cement, is comprised of Portland cement hat contains 36 to 85 wt.-% of slag. CEM IV cement, also called pozzolanic cement, contains next to Portland cement 11 to 65% of mixtures of pozzolans, silica fume and fly ash. GEM V cement, also called composite cement, contains next to Portland cement 18 to 50 wt.-% of slag, or mixtures of natural pozzolans, calcined pozzolans, and fly ash. Additionally, the different types of cements may contain 5 wt.-% of additional inorganic, finely milled mineral compounds.

Fly ash is produced inter alia during the combustion of coal in power stations, and comprises fine particles of varying composition. The main ingredients of fly ash are silicon oxide, aluminum oxide, and calcium oxide. Class C fly ash (brown-coal fly ash) comprises according to WO 08/012438 about 10 wt.-% CaO, whereas class F fly ash (hard-coal fly ash) comprises less than 8% by weight, preferably less than 4% by weight, and typically about 3% by weight of CaO.

The term "calcium aluminate cements" refers to cements that predominantly comprise $CaO\times Al_2O_3$. They can, e.g., be obtained by melting calcium oxide (CeO) or limestone ($CaCO_3$) and bauxite or aluminate together. Calcium aluminate cement comprises about 20 to 40% by weight of CaO, up to about 5% by weight of $SiO_2$, about 35 to 80% by weight of $Al_2O_3$ and up to about 20% by weight of $Fe_2O$. Calcium aluminate cements are defined according to DIN EN 14647 (01/2006).

The term "calcium sulfoaluminate cement" refers to a cement which contains ye'elimite as well as calcium sulfate. Calcium sulfate may be provided as calcium sulfate dihydrate ($CaSO_4\times 2H_2O$), calcium sulfate hemihydrate ($CaSO_4\times \frac{1}{2}H_2O$) and anhydrite ($CaSO_4$). Natural occurring gypsum is $CaSO_4\times 2H_2O$. However, burnt gypsum can be in a variety of hydration states according to the generic formula $CaSO_4\times nH_2O$, with $0\leq n<2$.

Furthermore, various additives may be used according to the present invention. In a preferred embodiment, the at least one additive is selected from the group consisting of pH modifiers, fillers, accelerators, retarders, rheology modifiers, superplasticizers, fibers, surfactants, catalysts, and mixtures thereof.

Rheology modifiers adjust the viscosity and thus the flow behavior and ensure a good balance between consistency, durability and application properties. These modifiers can be based on synthetic polymers (e.g. acrylic polymers), cellulose, silica, starches or clays.

Superplasticizers are polymers that function as dispersant to avoid particle segregation and improve the rheology and thus workability of suspensions. Superplasticizers generally can be divided into four categories: lignosulfonates, melamine sulfonates, naphthalene sulfonates, and comb polymers (e.g. polycarboxylate ethers, polyaromatic ethers, cationic copolymers, and mixtures thereof).

The setting time of the inorganic foam can be prolonged/shortened by the addition of certain compounds called retarders/accelerators. Retarders can be divided into the groups of lignosulfonates, cellulose derivatives, hydroxyl carboxylic acids, organophosphates, synthetic retarders, and inorganic compounds. Non-limiting examples of retarders are hydroxyethyl cellulose, carboxymethyl hydroxyethyl cellulose, citric acid, tartaric acid, gluconic acid, glucoheptonate, maleic anhydride, 2-Acrylamido-2-methylpropane-sulfonic acid (AMPS) copolymers, borax, boric acid, and ZnO. Non-limiting examples of accelerators are $CaCl_2$, KCl, $Na_2SiO_3$, NaOH, $Ca(OH)_2$, and $CaO\times Al_2O_3$, lithium silicate, potassium silicate, and aluminum salts, such as aluminum sulfate.

Fibers (or stabilizing fibers) can be added during the foaming process to further increase the stability of the foam. Such fiber can be made of a variety of materials, such as rock (e.g. basalt), glass, carbon, organic polymers (e.g. polyethylene, polypropylene, polyacrylonitrile, polyamides, and polyvinyl alcohols), cellulose, lignocellulose, metals (e.g. iron or steel), and mixtures thereof. Organic fibers are preferred. The amount of the fibers can be up to 3 wt.-%, preferably from 0.1 to 2 wt.-%, more preferably 0.1 to 1.5 wt.-%, even more preferably 0.1 to 1 wt.-% and in particular 0.2 to 0.7 wt.-%, based on the at least one inorganic binder mixture. The fibers preferably have a length of up to 200 mm or up to 120 mm, preferably up to 100 mm, more preferably up to 50 mm, most preferably up to 25 mm and in particular up to 20 mm, and a diameter of up to 100 µm.

The term "filler" refers primarily to materials that can be added to increase the volume without impairing the properties of the foam. The fillers mentioned can be selected from the group consisting of quartz sand or powdered quartz, calcium carbonate, rock flour, low-density fillers (for example vermiculite, perlite, diatomaceous earth, mica, talc powder, magnesium oxide, foamed glass, hollow spheres, foam sand, clay, polymer particles), pigments (e.g. titanium dioxide), high density fillers (e.g. barium sulphate), metal salts (e.g. zinc salts, calcium salts, etc.), and mixtures thereof. Grain sizes suitable here are in particular up to 500 µm. It is particularly preferable that the average grain size is up to 300 µm, preferably up to 150 µm.

Surfactants, which may be used in addition to the amphiphilic compound as defined herein, include non-ionic surfactants, anionic surfactants, cationic surfactants, zwitterionic surfactants and proteins or synthetic polymers. However, surfactants are not preferred as they tend to yield open-cell foams.

Non-ionic surfactants include fatty alcohols, cetyl alcohol, stearyl alcohol, and cetostearyl alcohol (comprising predominantly cetyl and stearyl alcohols), and oleyl alcohol. Further examples include polyethylene glycol alkyl ethers (Brij) $CH_3—(CH_2)_{10-16}—(O—C_2H_4)_{1-25}—OH$ such as octaethylene glycol monododecyl ether or pentaethylene glycol monododecyl ether; polypropylene glycol alkyl ethers $CH_3—(CH_2)_{10-16}—(O—C_3H_6)_{1-25}—OH$; glucoside alkyl ethers $CH_3—(CH_2)_{10-16}—(O\text{-Glucoside})_{1-3}\text{-OH}$ such as decyl glucoside, lauryl glucoside, octyl glucoside; polyethylene glycol octylphenyl ethers $C_8H_{17}—(C_8H_4)—(O—C_2H_4)_{1-25}—OH$ such as Triton X-100; polyethylene glycol alkylphenyl ethers $C_9H_{19}—(C_6H_4)—(O—C_2H_4)_{1-25}—OH$ such as nonoxynol-9; glycerol alkyl esters such as glyceryl laurate; polyoxyethylene glycol sorbitan alkyl esters such as polysorbate; sorbitan alkyl esters such as spans; cocamide MEA, cocamide DEA; dodecyldimethylamine oxide; block copolymers of polyethylene glycol and polypropylene glycol such as poloxamers; polyethoxylated tallow amine (POEA). Preferred non-ionic surfactants also include alkyl polyglucosides. Alkyl polyglucosides generally have the formula $H—(C_6H_{10}O_5)_m—O—R^1$, where $(C_6H_{10}O_5)$ is a glucose unit and $R^1$ is a $C_6$-$C_{22}$-alkyl group, preferably a $C_8$-$C_{16}$-alkyl group and in particular a $C_8$-$C_{12}$-alkyl group, and m=from 1 to 5.

Anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Others include docusate (dioctyl sodium sulfosuccinate), perfluorooctanesulfonate (PFOS), perfluorobutanesulfonate, alkyl-aryl ether phosphates, alkyl ether phosphates. Preferred carboxylates include the alkyl carboxylates, such as sodium stearate. More specialized species include sodium lauroyl Cationic surfactants include, dependent on the pH, primary, secondary, or tertiary amines: Primary and secondary amines become positively charged at pH<10. An example is octenidine dihydrochloride. Furthermore, cationic surfactants include permanently charged quaternary ammonium salts, such as cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates, as in the sultaines CHAPS (3-[(3-Cholamidopropyl)dimethylammonio]-1-propanesulfonate) and cocamidopropyl hydroxysultaine. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolamine, phosphatidylcholine, and sphingomyelins. Non-limiting examples of proteins are bovine serum albumin, egg ovalbumin, milk caseins or beta-lactoglobulin.

The proportion of the surfactant can vary over a broad range. The surfactant may be present in an amount of up to 2.5 wt.-%, preferably up to 1.5 wt.-%.

Catalysts that may be used as additives are catalysts that may be used in combination with a chemical foaming agent. Suitable catalysts are mentioned above and below in the context of blowing agents.

Further details regarding the amounts of the components as used according to the present invention are defined hereinafter.

As mentioned above, the amounts of the components according to the present invention are preferably as follows. In particular,
 the amount of amphiphilic compound to inorganic particle surface is from 0.5 to 160 µmol/m²; and/or
 the inorganic particles are provided in an amount of from 0.1 to 25 wt.-% with regard to the amount of the at least one inorganic binder mixture; and/or
 the weight ratio of water to at least one inorganic binder mixture is from 0.1 to 2.0.

In one exemplary embodiment, the amount of amphiphilic compound to inorganic particle surface is from 1 to 100 µmol/m², preferably from 2 to 70 µmol/m²; and/or
 the inorganic particles are provided in an amount of from 0.25 to 15 wt.-% with regard to the amount of the at least one inorganic binder mixture; and/or
 the weight ratio of water to the inorganic binder mixture is from 0.2 to 1.5.

If the inorganic binder mixture comprises
 (iiia) at least one inorganic binder selected from the group consisting of blast furnace slag, microsilica, metakaolin, aluminosilicates, and mixtures thereof, and
 (iiic) at least one additional inorganic binder selected from portland cement, calcium aluminate cement, calcium sulfoaluminate cement, calcium sulfate, and fly ash, and mixtures thereof,
the amount of the additional inorganic binder (iiic) has to be less than 30 wt.-%, preferably less than 25 wt.-% and in particular less than 20 wt.-%, based on the total inorganic foam formulation.

As explained above, it is to be understood that at least one group, i.e. one or more groups, of inorganic particles and at least one, i.e. one or more members, of amphiphilic compounds may be used. The above amounts refer to the overall amount of amphiphilic compounds and inorganic particles, respectively, being used in the process of the invention or being present in the composition, the inorganic foam or the cellular material of the invention. Furthermore, the above amount in relation to the at least one inorganic binder mixture refers to the overall amount of inorganic binders being used in the process of the invention or being present in the composition, the inorganic foam or the cellular material of the invention.

Suitable amounts or the additives may vary over a broad range and also depend on the type of additive. Typically, the at least one additive is provided in weight ratio of from 0.0003 to 30 wt.-%, or of from 0.03 to 25 wt.-%, based on the amount of the at least one inorganic binder. However, fillers may also be used in higher amounts. In particular, the filler may be present in similar amounts as the inorganic binder. Preferably, the weight ratio of filler to at least one inorganic binder mixture may be from 2:1 to 1:100, preferably from 1:1 to 1:10.

Further details regarding the process of the invention are provided hereinafter. In a preferred embodiment of the process of the invention, step (1) comprises the steps of
- (1a) dispersing the at least one group of inorganic particles, the at least one amphiphilic compound, and optionally at least one additive in water to obtain an aqueous dispersion; and
- (1b) mixing the aqueous dispersion with the at least one inorganic binder mixture.

It is to be understood that in step (1a) the at least one group of inorganic particles, the at least one amphiphilic compound, and optionally the at least one additive are preferably first combined with each other and the resulting mixture is then dispersed in water.

In a preferred embodiment of the process of the invention, step (2) comprises foaming the resulting foam formulation by chemical foaming. In another preferred embodiment of the process of the invention, step (2) comprises foaming the resulting foam formulation by physical foaming. In yet another preferred embodiment of the process of the invention, step (2) comprises foaming the resulting foam formulation by mechanical foaming.

In a preferred embodiment, step (2) of the process for preparing an inorganic foam comprises foaming the resulting foam formulation with a blowing agent, preferably by mixing the foam formulation obtained in step (1) with carbonates or bicarbonates, such as $CaCO_3$, $Na_2CO_3$, and $NaHCO_3$, aluminium powder, p-toluenesulfonylhydrazide, hydrogen peroxide, dibenzylperoxide, perchloric acid, peroxomonosulfuric acid, dicumyl peroxide, cumyl hydroperoxide or mixtures thereof, more preferably hydrogen peroxide. In a more preferred embodiment, foaming of the foam formulation in step (2) is performed with a blowing agent, preferably by mixing the foam formulation obtained in step (1) with aluminum powder or with a carbonate in the presence of an acid or with an aqueous solution of hydrogen peroxide, optionally in the presence of a catalyst.

In a more preferred embodiment, step (2) of the process for preparing an inorganic foam comprises foaming the resulting foam formulation with a blowing agent, preferably a blowing agent as defined above, wherein the blowing agent is added in an amount of from 0.1 to 10 wt.-%, based on the total amount of the foam formulation.

It is possible to accelerate the foaming process, in particular foaming with a peroxide as blowing agent, by the addition of a suitable catalyst. In a preferred embodiment, step (2) of the process for preparing an inorganic foam therefore comprises foaming the resulting foam formulation with a chemical blowing agent in the presence of a catalyst, wherein preferably the catalyst comprises $Mn^{2+}$, $Mn^{4+}$, $Mn^{7+}$ or $Fe^{3+}$ cations, or the catalyst is the enzyme catalase. More preferably, the catalyst is selected from the group consisting of $MnSO_4$, $MnO_2$, $KMnO_4$, and mixtures thereof. The catalyst may be used in an amount of from 0.01 to 5 wt.-%, preferably from 0.01 to 1 wt.-% more preferably from 0.05 to 0.5 wt.-%, and in particular from 0.1 to 0.3 wt.-%, based on to total amount of foam formulation.

In a preferred embodiment, the chemical blowing agent is hydrogen peroxide provided as an aqueous hydrogen peroxide solution comprising from 10 to 60 wt.-%, preferably from 20 to 60 wt.-% and in particular from 40 to 60 wt.-% hydrogen peroxide, wherein the aqueous hydrogen peroxide solution is added in an amount of from 0.1 to 6 wt.-%, preferably from 0.5 to 5.0 wt.-% and in particular from 1 to 4 wt.-%, based on the total weight of the foam formulation, assuming an about 50 wt.-% hydrogen peroxide solution.

In another preferred embodiment, mechanical foaming is performed, preferably by using a mixer, or by an oscillating process, or by a stator-rotor process.

After the foaming step (2), the inorganic foam according to the invention is obtained. In a preferred embodiment, the freshly prepared inorganic foam is allowed to harden in a sealed container after step 2). In a more preferred embodiment, the freshly prepared inorganic foam is allowed to harden for at least 12 h in a sealed container after step 2). Hardening can be performed at a temperature in the range of from 0° C. to 100° C., preferably 20° C. to 80° C.

A cellular material is obtained by hardening, and optionally drying the above mentioned inorganic foam. The cellular material according to the present invention may be in the form of a heat insulation element, an acoustic absorption element or a fire protection element, wherein the element may in each case, e.g., be a sheet or board.

The inorganic foams and cellular materials according to the invention have a closed-cell structure and the following advantageous features.

The dry density is typically below 300 kg/m$^3$, suitably below 200 kg/m$^3$, preferably below 150 kg/m$^3$ and more preferably below 140 kg/m$^3$. It is advantageous that the dry density is typically slightly lower than the dry density of surfactant-stabilized geopolymer foams and cellular materials on the basis thereof.

The thermal conductivity (DIN EN 12667) is preferably below 50 mW/mK, more preferably below 45 mW/mK and in particular below 40 mW/mK. In general, the thermal conductivity is lower than the thermal conductivity of surfactant-stabilized geopolymer foams and cellular materials on the basis thereof.

The compressive strength (DIN EN 826) is preferably at least 60 kPa, preferably at least 100 kPa. The flexural strength is preferably at least 50 kPa, preferably at least 75 kPa. In comparison to surfactant-stabilized geopolymer foams, the compressive strength is typically significantly improved, in particular the compressive strength is typically at least twice as high. In comparison to surfactant-stabilized geopolymer foams, the flexural strength is typically significantly improved, in particular the flexural strength is typically at least three times as high.

The air flow resistance (DIN EN 29 053) is preferably at least 100 kPa s/m$^2$, more preferably at least 150 kPa s/m$^2$ and in particular at least 200 kPa s/m$^2$. It is advantageous that the air flow resistance is typically at least 50 times higher than the air flow resistance of surfactant-stabilized geopolymer foams and cellular materials on the basis thereof.

The present invention is further illustrated by the following examples.

EXAMPLES

Comparative Example 1

A geopolymer foam was prepared from the following composition of raw materials in weight percent:
- 20.5% Metakaolin (Argical™ 1200S, Imerys)
- 20.5% Fly ash (Microsit® M10, BauMineral)
- 7.8% Calcium aluminate cement (Ciment Fondu®, Kerneos)
- 1.2% Surfactant (Alkyl Polyglucoside, Glucopon® 225 DK, BASF)
- 0.2% PAN Fibers (6 mm, 6.7 dtex)
- 19.5% Water
- 27.4% Waterglass ("Kaliwasserglass K58", BASF)

2.9% NaOH

The liquid raw materials were first mixed with NaOH. The solid raw materials were added to the liquid components and stirred until a homogeneous slurry is created. The foam was then generated with a kitchen mixer. The so obtained foam was poured to a mold. The setting reaction took place and the foam started to solidify. The geopolymer foam was stored in humid atmosphere for 3 days to allow proper setting. Thereafter. It was demolded and dried at 70° C. until constant mass.

The resulting geopolymer foam part exhibited a dimension of 300 mm×300 mm×40 mm. Its dry density was 144 kg/m$^3$ and its thermal conductivity 42.1 mW/m·K. The compressive strength was 49 kPa, the flexural strength was 28 kPa. The sample featured an air flow resistivity of 4.2 kPa s/m$^2$. The foam exhibited mainly open pores.

Working Example 1

A mixture comprising 79.8 wt.-% calcium carbonate (Socal 31), 15.1 wt.-% butyl gallate and 5.1 wt.-% manganese (IV) oxide was premixed as "Foam Formation Powder".

A geopolymer foam was prepared from the following composition of raw materials in weight percent:
- 19.2% Metakaolin (Argical™ 1200S, Imerys)
- 19.2% Fly ash (Microsit® M10, BauMineral)
- 7.3% Calcium aluminate cement (Ciment Fondu®, Kerneos)
- 2.3% Foam Formation Powder
- 0.2% PAN Fibers (6 mm, 6.7 dtex)
- 23.4% Water
- 26.3% Waterglass ("Kaliwasserglass K58", BASF)
- 2.8% Hydrogen Peroxide (50 wt.-% solution)

The foam formation powder was first dispersed in water. Then, the suspension was added to the waterglass. The mix of metakaolin and fly ash was added and the suspension was stirred for 10 min. Subsequently, the calcium aluminate cement was admixed. After 15 min of stirring, the foaming of the suspension was initiated by adding the hydrogen peroxide. The so obtained slurry was poured to a mold where the foam expansion evolves until the decomposition of the hydrogen peroxide was completed. The prepared wet foam was stable until after about 30 min the setting reaction took place and the foam started to solidify. The geopolymer foam was stored in humid atmosphere for 3 days to allow proper setting. Thereafter, it was demolded and dried at 70° C. until constant mass.

The resulting geopolymer foam part exhibited a dimension of 200 mm×200 mm×50 mm. Its dry density was 127 kg/m$^3$ and its thermal conductivity 39.6 mW/mK. The compressive strength was 117 kPa, the flexural strength was 82 kPa. The sample featured an air flow resistivity of 233 kPa s/m$^2$. The foam exhibited mainly dosed pores.

The invention claimed is:

1. A process for preparing a closed-cell inorganic foam comprising the steps of:
   (1) mixing
      (i) at least one group of inorganic particles;
      (ii) at least one amphiphilic compound;
      (iii) at least one inorganic binder mixture comprising
         (iiia) at least one inorganic binder selected from the group consisting of blast furnace slag, microsilica, metakaolin, aluminosilicates, and mixtures thereof,
         (iiib) at least one alkaline activator selected from the group consisting of alkali metal hydroxides, alkali metal carbonates, alkali metal aluminates, alkali metal silicates, and mixtures thereof,
         wherein the (i) at least one group of inorganic particles is not identical to the (iiia) at least one inorganic binder or the (iiib) at least one alkaline activator;
      (iv) water; and optionally
      (v) at least one additive; and
   (2) foaming the resulting foam formulation by chemical, physical or mechanical foaming,
      wherein the at least one amphiphilic compound comprises amphiphilic compounds with at least one polar head group and at least one apolar tail group, wherein the at least one head group is selected from the group consisting of phosphates, phosphonates, sulfates, sulfonates, alcohols, amines, amides, pyrrolidines, gallates, and carboxylic acids; and
      wherein the at least one tail group is selected from an aliphatic or an aromatic or a cyclic group with 2 to 8 carbon atoms, wherein the carbon atoms are optionally substituted with one or more, same or different substituents selected from $C_1$-$C_8$-alkyl, secondary —OH, and secondary —NH$_2$.

2. The process according to claim 1, wherein the at least one group of inorganic particles is selected from the group consisting of oxides, hydroxides, carbides, nitrides, phosphates, carbonates, silicates, sulfates, and mixtures thereof.

3. The process according to claim 1, wherein the at least one group of inorganic particles is selected from the group consisting of silica particles, alumina particles, zirconia particles, $CaCO_3$ particles, and mixtures thereof.

4. The process according to claim 1, wherein the at least one group of inorganic particles has a median particle size $D_{50}$ in the range of from 30 nm to 300 μm.

5. The process according to claim 1, wherein the at least one amphiphilic compound comprises amphiphilic compounds with at least one head group selected from the group consisting of carboxylic acids, gallates and amines, and at least one tail group selected from aliphatic groups with 2 to 8 carbon atoms.

6. The process according to claim 1, wherein the at least one inorganic binder is metakaolin.

7. The process according to claim 1, wherein the at least one alkaline activator is waterglass.

8. The process according to claim 1, wherein the at least one additive is selected from the group consisting of fillers, accelerators, retarders, rheology modifiers, superplasticizers, fibers, surfactants, catalysts, further hydrophobization agents, and mixtures thereof.

9. The process according to claim 1, wherein the amount of amphiphilic compound to inorganic particle surface is from 0.5 to 160 μmol/m$^2$; and/or wherein the inorganic particles are provided in an amount of from 1 to 25 wt.-% with regard to the amount of the at least one inorganic binder mixture; and/or wherein the weight ratio of water to the at least one inorganic binder mixture is from 0.1 to 2.0.

10. The process according to claim 1, wherein step (1) comprises the steps of
   (1a) dispersing the at least one group of inorganic particles, the at least one amphiphilic compound and optionally the at least one additive in water to obtain an aqueous dispersion; and
   (1b) mixing the aqueous dispersion with the at least one inorganic binder mixture.

11. An inorganic foam obtained by the process according to claim 1.

12. A closed-cell inorganic foam comprising:
(i) at least one group of inorganic particles;
(ii) at least one amphiphilic compound, wherein the at least one amphiphilic compound comprises amphiphilic compounds with at least one polar head group and at least one apolar tail group, wherein the at least one head group is selected from the group consisting of phosphates, phosphonates, sulfates, sulfonates, alcohols, amines, amides, pyrrolidines, gallates, and carboxylic acids; and wherein the at least one tail group is selected from an aliphatic or an aromatic or a cyclic group with 2 to 8 carbon atoms, wherein the carbon atoms are optionally substituted with one or more, same or different substituents selected from $C_1$-$C_8$-alkyl, secondary —OH, and secondary —$NH_2$;
(iii) at least one inorganic binder mixture comprising
   (iiia) at least one inorganic binder selected from the group consisting of blast furnace slag, microsilica, metakaolin, aluminosilicates, and mixtures thereof, and
   (iiib) at least one alkaline activator selected from the group consisting of alkali metal hydroxides, alkali metal carbonates, alkali metal aluminates, alkali metal silicates, and mixtures thereof;
   wherein the (i) at least one group of inorganic particles is not identical to the (iiia) at least one inorganic binder or the (iiib) at least one alkaline activator;
(iv) water; and optionally
(v) at least one additive.

13. A cellular material obtained by hardening and optionally drying an inorganic foam according to claim 12.

14. A cellular material obtained by hardening and optionally drying an inorganic foam according to claim 11.

* * * * *